(12) United States Patent
Luski et al.

(10) Patent No.: US 6,676,021 B1
(45) Date of Patent: Jan. 13, 2004

(54) AUTHENTICATED CARDS

(75) Inventors: Shalom Luski, Rehovot (IL); Zvi Nitzan, Petach Tikva (IL)

(73) Assignee: Power Paper Ltd., Beit Shemesh (IL)

( * ) Notice: Subject to any disclaimer, the term of this patent is extended or adjusted under 35 U.S.C. 154(b) by 0 days.

(21) Appl. No.: 09/958,835

(22) PCT Filed: Apr. 13, 2000

(86) PCT No.: PCT/IL00/00221
§ 371 (c)(1),
(2), (4) Date: Oct. 15, 2001

(87) PCT Pub. No.: WO00/62248
PCT Pub. Date: Oct. 19, 2000

Related U.S. Application Data

(60) Provisional application No. 60/129,235, filed on Apr. 14, 1999.

(51) Int. Cl.[7] ................................................. G06K 19/06
(52) U.S. Cl. ........................................ 235/491; 235/488
(58) Field of Search .................................. 235/491, 488, 235/492, 493, 375, 380, 382.5, 382, 449; 360/2

(56) References Cited

U.S. PATENT DOCUMENTS

| | | | |
|---|---|---|---|
| 3,873,813 A | * 3/1975 | Lahr et al. | 235/380 |
| 5,652,043 A | 7/1997 | Nitzan | |
| 5,811,204 A | 9/1998 | Nitzan | |
| 5,897,522 A | 4/1999 | Nitzan | |
| 6,241,152 B1 | * 6/2001 | Fukasawa | 235/449 |
| 6,277,523 B1 | * 8/2001 | Giron | 429/304 |
| 6,475,559 B1 | * 11/2002 | Bettinger | 427/208.2 |

* cited by examiner

*Primary Examiner*—Thien M. Le
(74) *Attorney, Agent, or Firm*—G. E. Ehrlich (1995)Ltd.

(57) ABSTRACT

An authenticated card (10) comprises a flat card body (12) being formed with at least one region thereon (14) being irreversibly transformable from a first state to a second state, the second state being identifiable by a card holder as different from the first state.

25 Claims, 3 Drawing Sheets

AUTHENTICATED CARDS

This application claims the benefit of a U.S. Provisional Application no. 60/129,235 filed Apr. 14, 1999.

FIELD AND BACKGROUND OF THE INVENTION

The present invention relates to authenticated cards and, more particularly, to authenticated cards which overcome a major problem associated with scratchable cards, i.e., fraudulent forgery of such cards.

There are many applications where vendors offer services and/or benefits based on a card that holds a card unique data, such as a number or a code. In such cases, after the card is purchased at a point-of-sale by a card holder, the card unique data is exposed by scratching off a top scratchable layer that covers the data. Using the data thus revealed enables the card holder to make use of the card by quoting the exposed data to the card vendor or its representative. Examples of such cards include, but are not limited to, lottery tickets, pre-paid phone and internet cards and various card game applications.

Typically, the validity of such a prior art card expires when the cost of service or benefit used by the card holder is equivalent to the amount of currency paid by the card holder upon purchasing it. Thus, careful bookkeeping allows the vendor to notify the card holder of a card no longer useful. Such an exhausted card is typically discarded by the user.

In some cases, such discarded cards are unlawfully collected for felonious "recycling" and are reintroduced to the market as new cards by deceptively re-covering the exposed card unique data by a fresh top scratchable layer.

In other cases, new, yet unsold, cards are tampered with (scratched) in order to make use of the card unique data. Such cards are than also re-covered by a fresh top scratchable layer and sold to card holders.

There is thus a widely recognized need for, and it would be highly advantageous to have, novel authenticated cards devoid of the above limitations, which novel authenticated cards are much more difficult to forge.

SUMMARY OF THE INVENTION

According to the present invention there is provided an authenticated card comprising a flat card body being formed with at least one region thereon being irreversibly transformable from a first state into a second state, the second state being identifiable by a card holder as different from the first state.

According to further features in preferred embodiments of the invention described below, the at least one region includes an electro-chromic substance capable of irreversibly changing its color as a response to an electrical potential.

According to still further features in the described preferred embodiments the authenticated card further comprising an integrated power source, such that activating the power source to exert the electrical potential results in irreversible change in color of the electro-chromic substance.

According to still further features in the described preferred embodiments the electro-chromic substance is selected from the group consisting of Indium-Tin-Oxide and Indium-Antimony-Tin-Oxide.

According to still further features in the described preferred embodiments the electro-chromic substance encodes card unique data which becomes irreversibly visible to a card holder when the electro-chromic substance changes its color as a response to the electrical potential.

According to still further features in the described preferred embodiments the at least one region includes a heatable element capable of irreversibly changing an appearance of the at least one region when heated.

According to still further features in the described preferred embodiments the authenticated card further comprising an integrated power source, such that activating the power source to heat the heatable element results in irreversible change in appearance of the at least one region.

According to still further features in the described preferred embodiments the heatable element is selected from the group consisting of a resistor, a conductor and a semiconductor.

According to still further features in the described preferred embodiments the heatable element encodes card unique data which becomes irreversibly visible to a card holder when the heatable element is heated.

According to still further features in the described preferred embodiments the integrated power source includes a capacitor which can be discharged.

According to still further features in the described preferred embodiments the integrated power source includes a flexible thin layer open liquid state electrochemical cell.

According to still further features in the described preferred embodiments the integrated power source includes an inducible power source.

According to still further features in the described preferred embodiments the inducible power source includes a piezoelectric component which is mechanically inducible.

According to still further features in the described preferred embodiments the inducible power source is a radiofrequency inducible power source.

According to still further features in the described preferred embodiments the at least one region includes a photo-chromic substance capable of irreversibly changing its color as a response to lighting in a predefined wavelength.

According to still further features in the described preferred embodiments the photo-chromic substance is selected from the group consisting of Oxazine and Naphthopyran.

According to still further features in the described preferred embodiments the photo-chromic substance encodes card unique data which becomes irreversibly visible to a card holder when the electro-chromic substance changes its color as a response to the lighting.

According to still further features in the described preferred embodiments the at least one region includes a thermo-chromic substance capable of irreversibly changing its color as a response to external heating.

According to still further features in the described preferred embodiments wherein the thermo-chromic substance is $M_2HgI_4$, where M is selected from the group consisting of Ag(I) and Cu(I).

According to still further features in the described preferred embodiments the thermo-chromic substance encodes card unique data which becomes irreversibly visible to a card holder when the electro-chromic substance changes its color as a response to the external heating.

According to still further features in the described preferred embodiments the card is selected from the group consisting of a prepaid card and a lottery card.

According to still further features in the described preferred embodiments the at least one region includes a first region which serves solely for authentication and a second region which serves for disclosing card unique data.

According to still further features in the described preferred embodiments each of the first and second regions is independently irreversibly transformable from the first state into the second state.

The present invention successfully addresses the shortcomings of the presently known configurations by providing a card which is much less forgeable as is compared with prior art scratchable cards.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
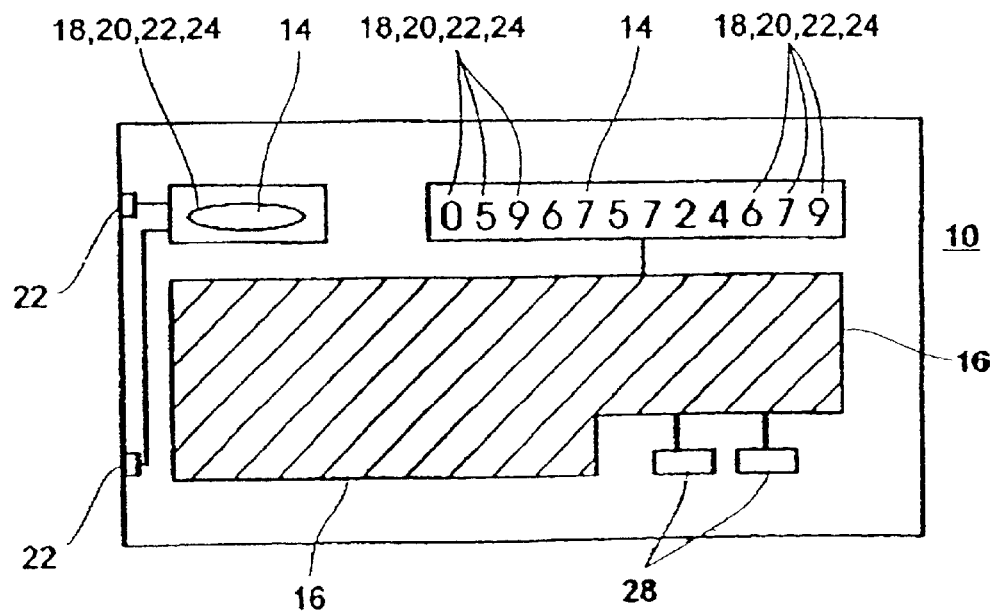
FIG. 1 is a schematic depiction of an authenticated card in accordance with the teachings of the present invention.

The present invention is of authenticated cards which can be used, for example, as more secured, less prone to fraudulent use, prepaid cards or lottery cards. Specifically, the present invention can be used to prevent or render much more sophisticated and difficult card forgery.

The principles and operation of an authenticated card according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Thus, according to the present invention there is provided an authenticated card which is referred to hereinbelow as card 10. Card 10 of the present invention includes a flat card body 12, having a thickness typically in the range of 0.1 to 0.8 mm and dimensions of, typically about 8.5×about 5.5 cm, so as to comfortably fit into a wallet. Card body 12 is formed with at least one region thereon 14 (two are shown, a single region may include a plurality of subregions) which is irreversibly transformable from a first state into a second state, while the second state is identifiable by a card holder as different from the first state.

Thus, a region 14 can transform from a non-detectable region (first state) into a detectable, e.g., colored region (second state), or from a region having one color (first state) into a region having another, readily distinguishable, color (second state), all as is further described and specifically exemplified hereinbelow.

According to one embodiment of the present invention, each of regions 14 includes an electro-chromic substance 18, which may be applied in different desirable patterns, and which is capable of irreversibly changing its color as a response to an electrical potential. Such electrical potential can, for example, be provided, from an integrated power source 16, such that activating the power source to exert the electrical potential, results in irreversible change in color of the electro-chromic substance. Alternatively, an external power source can be employed, wherein card 10 is provided with appropriate terminals 22 for establishing electrical connection thereto. Examples of electro-chromic substances suitable for use with card 10 of the present invention include, but are not limited to, Indium-Tin-Oxide and Indium-Antimony-Tin-Oxide. In one embodiment of the invention, at least one region 14 which includes the electro-chromic substance encodes card unique data (e.g., a code of numbers or an alphanumeric code) which becomes irreversibly visible to a card holder when the electro-chromic substance changes its color as a response to the electrical potential.

According to another embodiment of the present invention region(s) 14 include a heatable element 20 which is capable of irreversibly changing an appearance of a region 14 when heated, by for example, inflicting burn marks thereon. Heatable element 20 can be, for example, a heatable resistor (heating wire), a heatable conductor or a heatable semiconductor, e.g., semiconductor junction. Again, an external power source or preferably integrated power source 16 are selected such that activating power source 16 to heat heatable element 20 results in irreversible change in appearance of region(s) 14. Similarly to the above embodiment, according to a preferred configuration heatable element 20 encodes card unique data which becomes irreversibly visible to a card holder when heatable element 20 is heated. Alternatively, the card unique data can be encoded by physically juxtaposing materials which are heat resistant and heat sensitive and which overlay heatable clement 20.

According to a preferred embodiment of the present invention the integrated power source includes a capacitor which can be discharged, thereby providing high voltage which is required for implementing some of the embodiments of the present invention as herein described. Such a capacitor can be charged by an integrated battery (electrochemical cell) or in other cases, by an inducible power source, such as, but not limited to, a radiofrequency responsive coil or a piezoelectric component which is mechanically inducible. Direct power supply can also be effected by any of the above power sources, as well as AC power, when combined with a DC to AC converter.

A highly suitable power source for use with card 10 of the present invention includes a flexible thin layer open liquid state electrochemical cell. The structure, manufacture and integration into electronic applications of such a flexible thin layer open liquid state electrochemical cell are described in detail in U.S. Pat. Nos. 5,652,043; 5,811,204 and 5,897,522, all to Nitzan, which are incorporated by reference as if fully set forth herein.

Briefly, the cell described in these U.S. Patents is an open liquid state electrochemical cell which can be used as a primary or rechargeable power supply for various miniaturized and portable electrically powered devices of compact design. The cell comprises a first layer of insoluble negative pole, a second layer of insoluble positive pole and a third layer of aqueous electrolyte, the third layer being disposed between the first and second layers and including (a) a deliquescent material for keeping the open cell wet at all times; (b) an electroactive soluble material for obtaining required ionic conductivity; and, (c) a watersoluble polymer for obtaining a required viscosity for adhering the first and second layers to the first layer. Several preferred embodiments of the battery disclosed in U.S. Pat. No. 5,652,043 include (i) engaging the electrolyte layer in a porous substance, such as, but not limited to, a filter paper, a plastic membrane, a cellulose membrane and a cloth; (ii) having the first layer of insoluble positive pole include manganese-dioxide powder and the second layer of insoluble negative pole include zinc powder; (iii) having the first layer of insoluble negative pole and/or the second layer of insoluble positive pole further include carbon powder; (iv) selecting the electroactive soluble from zinc-chloride, zinc-bromide, zinc-fluoride and potassium-hydroxide; (v) having the first layer of insoluble negative pole include silver-oxide powder and the second layer of insoluble positive pole include zinc powder and the electroactive soluble material is potassium-hydroxide; (vi) having the first layer of insoluble negative pole include cadmium powder and the second layer of insoluble positive pole include nickel-oxide powder and selecting the electroactive soluble material to be potassium-hydroxide; (vii) having the first layer of insoluble negative pole include iron powder and the second layer of insoluble positive pole include nickel-oxide powder and selecting the electroactive soluble material to be potassium-hydroxide; (viii) having the first layer of insoluble negative pole and the second layer of insoluble positive pole include lead-oxide powder, the cell is charged by voltage applied to the poles and the electroactive soluble material is selected in this case to be sulfuric-acid; (ix) the deliquescent material and the electroactive soluble material can be the same material such as zinc-chloride, zinc-bromide, zinc-fluoride and potassium-hydroxide; (x) the deliquescent material is selected from the group consisting of calcium-chloride, calcium-bromide, potassiumbiphosphate and potassium-acetate; (xi) the water-soluble polymer can be polyvinylalcohol, poliacrylamide, polyacrylic acid, polyvinylpyrolidone, polyethylenoxide, agar, agarose, starch, hydroxyethylcellulose and combinations and copolymers thereof; (xii) the watersoluble polymer and the deliquescent material can be the same material such as dextrane, dextranesulfate and combinations and copolymers thereof. The cell described in these U.S. patents preferably includes terminals, each of the terminals being in electrical contact with one of the first and second pole layers. Such terminals can be made, for example, of graphite or a metal, such as iron, nickel, titanium, copper, stainless steel and mixtures thereof. The terminals can be applied to the cell and the entire cell can be manufactured by a suitable printing technology such as, but not limited to, silk print, offset print, jet printing, lamination, materials evaporation or powder dispersion. At least one carbon or graphite based conductive layer can be employed with the cell for improving the electronic conductivity of at least one of the first and second pole layers. Preferred configurations for power source 16 of card 10 according to the present invention involve those combinations which are devoid of poisonous compounds.

According to another embodiment of the present invention region(s) 14 of card 10 include a photo-chromic substance 22 which is capable of irreversibly changing its color as a response to lighting in a predefined wavelength, e.g., the visible range and/or ultraviolet radiation. Examples of photo-chromic substances suitable for use with card 10 of the present invention include Oxazine and Naphthopyran. Suitable radiation sources for activating the photo-chromic substance include sunlight, an ultraviolet light source, and any other artificial light source in a suitable wavelength range. The photo-chromic substance preferably encodes card unique data which becomes irreversibly visible to a card holder when the photo-chromic substance changes its color as a response to lighting. A removable light impermeable cover can be used to protect the card from light exposure prior to use.

According to another embodiment of the present invention region(s) 14 of card 10 include a thermo-chromic substance 24 which is capable of irreversibly changing its color as a response to external heating. Examples of thermo-chromic substances suitable for use with card 10 of the present invention include $M_2HgI_4$, where M is Ag(I) or Cu(I). Suitable radiation sources for activating the thermo-chromic substance include sunlight, an infrared light source, and any other heat source. The thermo-chromic substance preferably encodes card unique data which becomes irreversibly visible to a card holder when the electro-chromic substance changes its color as a response to external heating.

Figure 2:
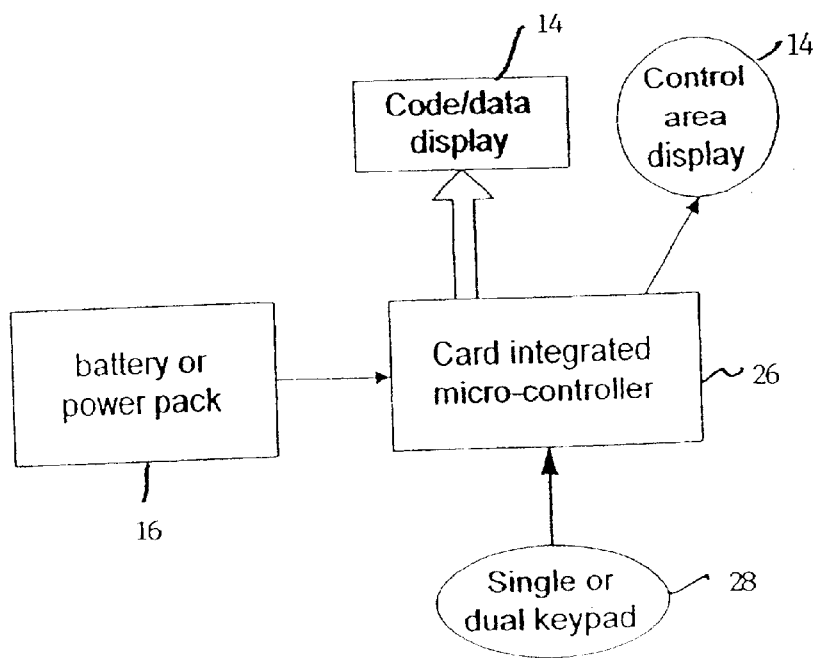
FIG. 2 is a box diagram depicting some of the components embedded within a card of the present invention in accordance with a power source containing embodiments thereof.
Figure 3A:
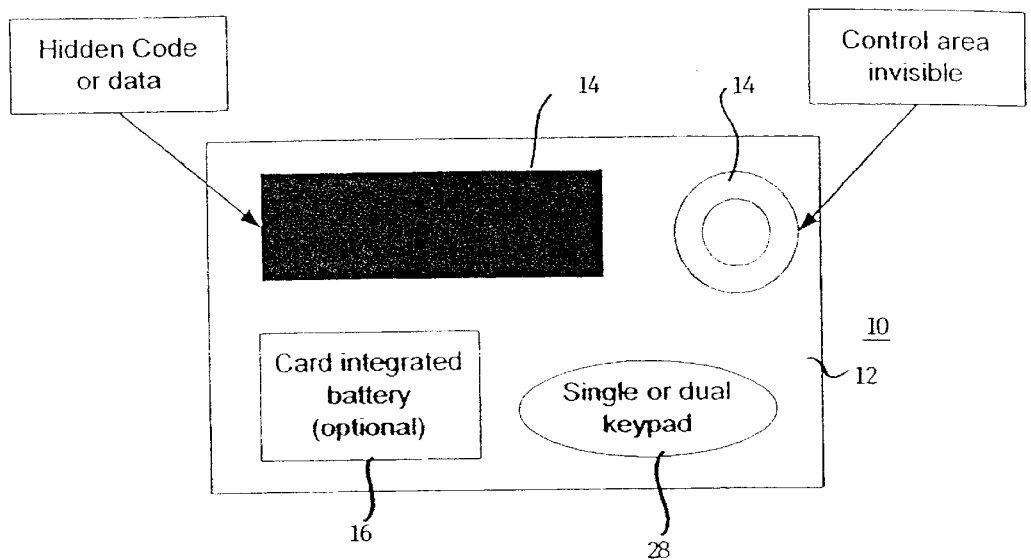
FIGS. 3a–c are schematic depictions of an authenticated card in accordance with the teachings of the present invention in three operation states: before purchase, authenticated at a point of purchase and activated to disclose coded data therein in privacy of a card holder.
Figure 3B:
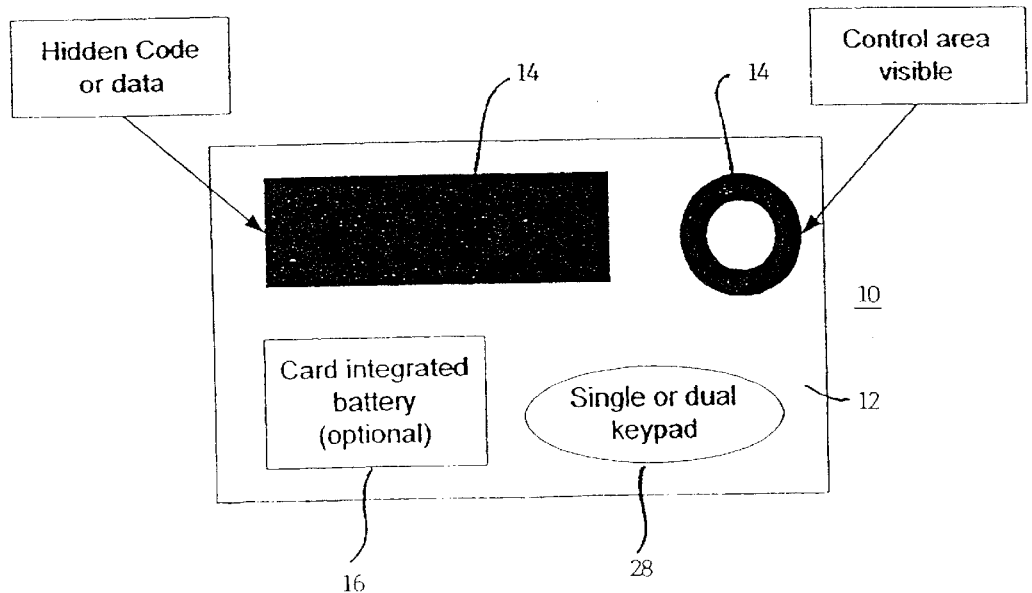
Figure 3C:
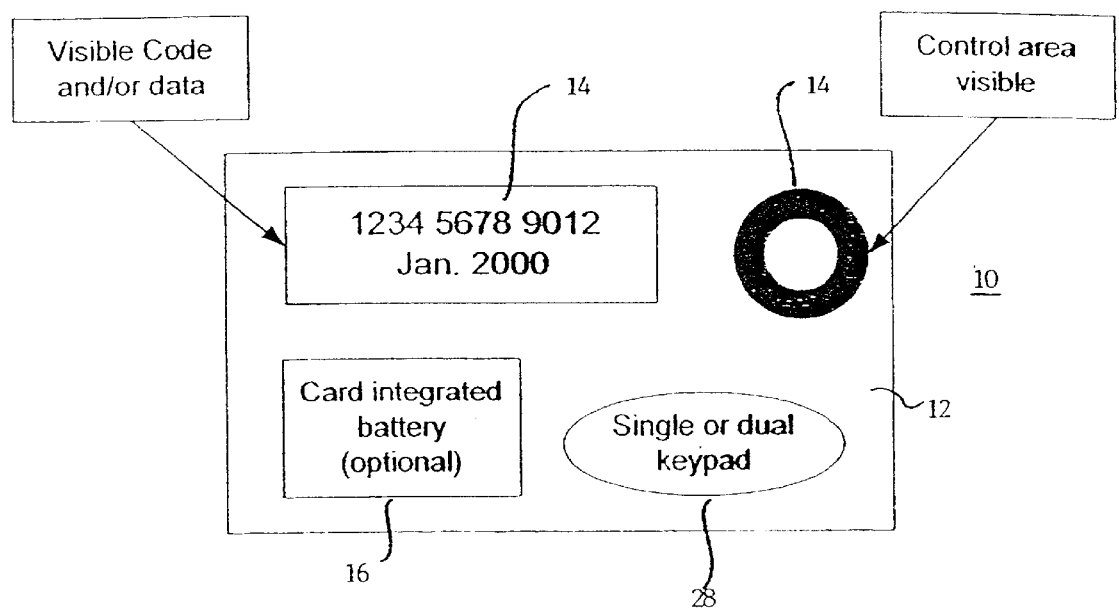

As is specifically shown in FIG. 2, according to a preferred embodiment of the present invention a card integrated micro controller 26 is employed along with one or more (e.g., dual) keys of a keypad 28 to control the supply of power from power source 16 to any one or more of regions 14. As is shown in FIGS. 2 and 3a–c, according to a presently preferred embodiment, a first region 14 serves solely for authentication (control area display) and a second region 14 serves for disclosing card unique data (code/data display). According to a preferred embodiment each of the first and second regions 14 is independently irreversibly transformable from the first state into the second state, under the control of, for example, controller 26 and keypad 28. Thus, at point of purchase, authentication region 14 is examined and activated, whereas under privacy, a card holder activated the other region 14 to thereby expose the card unique data.

It is expected that during the life of this patent many relevant electro-chromic, thermo-chromic and photo-chromic substances will be developed and/or uncovered and the scope of the present invention is intended to include all such new substances a priori.

The use of such substances and of heatable elements which may inflict burns according to the present invention provides the card of the present invention with far superior protection against fraudulent use.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An authenticated card comprising a flat card body being formed with at least one region thereon being irreversibly transformable from a first state into a second state, said second state being identifiable by a card holder as different from said first state;
   wherein said at least one region includes an electro-chromic substance capable of irreversibly changing its color as a response to an electrical potential.
   further comprising an integrated power source, such that activating said power source to exert said electrical potential results in irreversible change in color of said electro-chromic substance.

2. The authenticated card of claim 1, wherein said integrated power source includes a flexible thin layer open liquid state electrochemical cell.

3. The authenticated card of claim 1, wherein said integrated power source includes an inducible power source.

4. The authenticated card of claim 3, wherein said inducible power source includes a piezoelectric component which is mechanically inducible.

5. The authenticated card of claim 3, wherein said inducible power source is a radiofrequency inducible power source.

6. The authenticated card of claim 1, wherein said electro-chromic substance is selected from the group consisting of Indium-Tin-Oxide and Indium-Antimony-Tin-Oxide.

7. An authenticated card comprising a flat card body being formed with at least one region thereon being irreversibly transformable from a first state into a second state, said second state being identifiable by a card holder as different from said first state;
   wherein said at least one region includes an electro-chromic substance capable of irreversibly changing its color as a response to an electrical potential;
   wherein said electro-chromic substance encodes card unique data which becomes irreversibly visible to a card holder when said electro-chromic substance changes its color as a response to said electrical potential.

8. An authenticated card comprising a flat card body being formed with at least one region thereon being irreversibly transformable from a first state into a second state, said second state being identifiable by a card holder as different from said first state;
   wherein said at least one region includes a heatable element capable of irreversibly changing an appearance of said at least one region when heated.

9. The authenticated card of claim 8, further comprising an integrated power source, such that activating said power source to heat said heatable element results in irreversible change in appearance of said at least one region.

10. The authenticated card of claim 9, wherein said integrated power source includes a capacitor which can be discharged.

11. The authenticated card of claim 9, wherein said integrated power source includes a flexible thin layer open liquid state electrochemical cell.

12. The authenticated card of claim 9, wherein said integrated power source includes an inducible power source.

13. The authenticated card of claim 12, wherein said inducible power source includes a piezoelectric component which is mechanically inducible.

14. The authenticated card of claim 12, wherein said inducible power source is a radiofrequency inducible power source.

15. The authenticated card of claim 8, wherein said heatable element is selected from the group consisting of a resistor, a conductor and a semiconductor.

16. The authenticated card of claim 8, wherein said heatable element encodes card unique data which becomes irreversibly visible to a card holder when said heatable element is heated.

17. An authenticated card comprising a flat card body being formed with at least one region thereon being irreversibly transformable from a first state into a second state, said second state being identifiable by a card holder as different from said first state;
   wherein said at least one region includes a photo-chromic substance capable of irreversibly changing its color as a response to lighting in a predefined wavelength.

18. The authenticated card of claim 17, wherein said photo-chromic substance is selected from the group consisting of Oxazine and Naphthopyran.

19. The authenticated card of claim 17, wherein said photo-chromic substance encodes card unique data which becomes irreversibly visible to a card holder when said electro-chromic substance changes its color as a response to said lighting.

20. An authenticated card comprising a flat card body being formed with at least one region thereon being irreversibly transformable from a first state into a second state, said second state being identifiable by a card holder as different from said first state;
   wherein said at least one region includes a thermo-chromic substance capable of irreversibly changing its color as a response to external heating.

21. The authenticated card of claim 20, wherein said thermo-chromic substance is M2HgI4, where M is selected from the group consisting of Ag(I) and Cu(I).

22. The authenticated card of claim 20, wherein said thermo-chromic substance encodes card unique data which becomes irreversibly visible to a card holder when said electro-chromic substance changes its color as a response to said external heating.

23. An authenticated card comprising a flat card body being formed with at least one region thereon being irreversibly transformable from a first state into a second state, said second state being identifiable by a card holder as different from said first state,
   wherein the card is selected from the group consisting of a prepaid card and a lottery card.

24. An authenticated card comprising a flat card body being formed with at least one region thereon being irreversibly transformable from a state into a second state, said second state being identifiable by a card holder as different from said first state;
   wherein said at least one region includes a first region which serves solely for authentication and a second region which serves for disclosing card unique data.

25. An authenticated card comprising a flat card body being formed with at least one region thereon being irreversibly transformable from a first state into a second state, said second state being identifiable by a card holder as different from said first state;
   wherein each of said first and second regions is independently irreversibly transformable from said first state into said second state.

* * * * *